INVENTORS.
DONALD H. BARNHILL
ROBERT E. DOBRZYNSKI
RICHARD J. ROSTAL
BY *Gordon Reed*
ATTORNEY

United States Patent Office 3,489,004
Patented Jan. 13, 1970

3,489,004
NAVIGATIONAL REFERENCE DEVICE
Donald H. Barnhill, New Brighton, Robert E. Dobrzynski, Anoka, and Richard J. Rostal, Columbia Heights, Minn., assignors to Honeywell Inc., Minneapolis, Minn., a corporation of Minnesota
Filed July 21, 1966, Ser. No. 566,985
Int. Cl. G01c 21/00
U.S. Cl. 73—178          10 Claims

ABSTRACT OF THE DISCLOSURE

Four gyroscopic craft attitude or attitude rate sensors are fixed on a craft with their input axes all oblique with respect to the orthogonal roll, pitch and yaw axes of the craft. The four sensors are emplaced so that all four sensor output axes are in a common plane and each of the input axes lies in a different octant of the orthogonal craft axis system and makes equal angles with the system axes. With the redundancy of sensors and this symmetrical arrangement, signals representing movement about each of the craft axes and comparisons which facilitate the detection of malfunctions are simply obtained by the summation of selected sensor outputs.

---

This invention relates to improvements in condition control apparatus such as improvements in apparatus for navigating an aircraft. Such apparatus for navigating an aircraft may include an attitude reference system and the invention herein relates primarily to improvements in attitude reference systems for dirigible craft such as aircraft. A major consideration associated with selection of an attitude reference system for a space craft is reliability. Such consideration is especially significant where the mission of such craft is of long duration. The improvement herein pertains to increasing reliability of an attitude reference system by the application of the redundancy principle. Thus an object of this invention is to provide an improved attitude or positional reference system for detecting movements of a craft about any of its three axes, X, Y and Z by means of a plurality of gyroscopes arranged with their input axes arranged in a skewed manner. By the term skewed is meant that in such arrangement none of the gyro input axes are orthogonal relative to the axes of the craft.

A further object of this invention is to provide an attitude or positional reference system for detecting movements of the craft about any of its three orthogonal axes by means of four gyros having their input axes arranged in a skewed manner with respect to the craft axes.

A further object of this invention is to detect a malfunction in any of four skewed craft mounted gyros.

A further object of this invention is to obtain or detect the movement of a craft about any of its three orthogonal axes by signals obtained from two skewed mounted gyros.

A further object of this invention is to obtain a fault indication in any of a plurality of skewed mounted gyros in an attitude reference system.

A further object of this invention is to provide an improved attitude reference system wherein a plurality of gyroscopes having their output axes at an oblique angle to the orthogonal axes of the craft provide collectively signals indicating the movements of the craft about its axes.

A further object of the invention is to obtain the movements of the craft about its principal orthogonal axes from three gyros having their output axes each mounted at an oblique angle to each of the orthogonal axes. The above and other objects of the invention will become apparent from a consideration of the following specification and appended claims in conjunction with the accompanying drawing in which:

Figure 2:
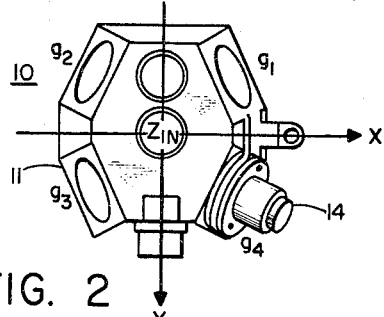
FIGURE 2 shows in plan view the emplacement of the gyroscopes employed for minimum acceleration drift sensitivity constraint.

Below is described an attitude reference family with a broad spectrum of redundancy alternates and operational features. This family can contribute towards solving the attitude reference design and selection problem. Emphasis is devoted to the novel features of the family involving skewed redundancy. Conventional features are also described and provide a general comparison framework. Redundancy alternates of the family are:

Three orthogonal gyros (non-redundant); four skewed gyros; five skewed gyros.

ATTITUDE REFERENCE

Redundancy considerations

Selection of a redundancy configuration involves consideration of:

Reliability
Performance
Implementation—fabrication and packaging
Failure detection and isolation Performance is not generally a factor establishing a redundancy configuration. However, the nature of the skewed redundancy alternates considered herein is such that performance must be included. This need arises from the "geometrical amplification" of gyro drift that occurs with skewed gyro emplacement; the extent of this amplification is directly related to the particular emplacement orientation employed. With the above as criteria, the redundancy considerations associated with the alternates are compared in the following paragraphs.

Reliability

The primary purpose of employing more than three gyros in a three-axis attitude reference is to improve reliability. A comparison of reliability prediction computations pertaining to the redundancy configurations is presented in Table 1.

TABLE 1.—COMPARISON OF RELIABILITY PREDICTION COMPUTATIONS

|  | Reliability | |
|---|---|---|
|  | Standby redundant | Parallel redundant |
| Three gyros (orthogonal) | 0.94 | 0.94 |
| Four gyros (skewed) | 0.9982 | 0.9976 |
| Five gyros (skewed) | 0.999964 | 0.999928 |
| Six gyros (two per orthogonal axis) | 0.9994 | 0.9988 |
| Nine gyros (three per orthogonal axis) | 0.999996 | 0.999976 |

Performance

Generally, the performance of a skewed gyro package will not compare favorably with that of an orthogonal package. The extent to which the skewed package suffers in comparison depends largely upon the particular emplacement orientation selected for the package gyros. Table 2 compares the performance of a three-gyro orthogonal system, a four-gyro skewed system, and a five-gyro skewed system. The six-gyro and nine-gyro orthogonal systems are not included since their performance is identical with that of the three-gyro system.

TABLE 2.—PERFORMANCE COMPARISON

| System | Single axis | | Three axis | |
|---|---|---|---|---|
| | Expected value | Variance | Expected value | Variance |
| Three gyros, orthogonal | 0 | $\sigma^2$ | $1.58\sigma$ | $0.5\sigma^2$ |
| Four gyros, skewed | 0 | $1.5\sigma^2$ | $1.85\sigma^2$ | $1.1\sigma^2$ |
| Five gyros, skewed (typical) | 0 | $2.9\sigma^2$ | $2.6\sigma^2$ | $3.4\sigma^2$ |

$\sigma^2$=Variance of individual gyro drift.

The comparison criteria consists of the expected value and variance of the magnitude of both a single-axis and the total package drift vectors. A development of the error models employed for the comparison is presented in the Proceedings of the AIAA/JACC Guidance and Control Conference, University of Washington, Seattle, Wash., Aug. 15–17, 1966, in a paper titled Digital Attitude Reference-Redundancy and Temperature Control Considerations by D. H. Barnhill and D. C. Susens.

Implementation

Implementation of the different basic approaches discussed herein primarily involves consideration of gyro input axis orientation and gyro output axis orientation. Gyro input axis orientation involves both accuracy (as demonstrated in the Constant Drift Performance Analysis subsection of this paper) and mechanization complexity factors. Gyro output axis orientation embodies packaging, fabrication and accuracy (as relates to $g$ sensitive errors) factors. These considerations are discussed below.

Orthogonal systems (three, six or nine gyro)

This conventional approach presents no difficulty with regard to the orientation of the gyro input axis. A gyro input axis is placed collinear with each principal orthogonal reference axis and there is a one-to-one correspondence between a reference axis and a gyro output. No equations need be mechanized to obtain reference axes data. The orientation of the output axes can be established by considering the linear acceleration of the vehicle in which the system is to be employed. If, as in many spacecraft applications, the only appreciable vehicle linear acceleration occurs along the roll axis, two of the gyro output axes can be oriented to be drift insensitive to the linear acceleration. The third gyro will consequently be oriented to have maximum drift sensitivity to the acceleration. However, the resulting linear acceleration-induced drift will occur about the axis along which the acceleration is effected. In many applications such drift has no detrimental effect upon the missions. A further result of such output axis emplacement is that two output axes can be located in parallel and the third normal to these two. Such a situation facilitates machining of the gyro mounting block, assembly operations and test procedures.

Four-skewed-gyro system

This approach features an input axis emplacement orientation option which affords relative simplicity in the equations that must be mechanized to obtain reference axis data. The attitude reference employing this option is called a four-gyro skewed symmetric system.

General detail pertaining to this orientation option is presented as follows:

Consider a principal reference axis orthogonal triad $x$–$y$–$z$ (e.g., the roll, pitch, and yaw axes of a vehicle). The space associated with this triad will be divided into a set of eight distinct octants. Consider for example the upper four octants (i.e., those in which $z>0$). If the input axes of the four system gyros are emplaced so that (1) each is located in a different one of these four upper octants, and (2) each input axis has direction cosines (relative to the reference triad) whose magnitudes are equal, then the attitude reference system is "skewed" (nonorthogonal gyro input axes) and "symmetric" (equal direction cosine magnitudes). The actual angular positions for such a system are readily determined. Consider a unit vector lying along the gyro input axis in the first upper octant (i.e., $x>0$, $y>0$, and $z>0$). Then, $$a=b=c$$

where $a$, $b$, and $c$ are the direction cosines along the $x$, $y$, and $z$ axes respectively.

Further, $$a^2+b^2+c^2=1$$

so, $$3a^2=1$$

or $$a=\sqrt{3/3}$$

and $$b=\sqrt{3/3}$$

$$c=\sqrt{3/3}$$

Therefore, the angle between the gyro input axis and each reference triad axis is arc cosine $\sqrt{3/3} \approx 54.7°$.

A complete description of the system orientation is given by a matrix equation relating the rates about the system reference triad axes to those sensed by the gyro input axes:

$$\begin{bmatrix} \omega_{g_1} \\ \omega_{g_2} \\ \omega_{g_3} \\ \omega_{g_4} \end{bmatrix} = \frac{\sqrt{3}}{3} \begin{bmatrix} 1 & 1 & 1 \\ -1 & 1 & 1 \\ -1 & -1 & 1 \\ 1 & -1 & 1 \end{bmatrix} \begin{bmatrix} \omega_x \\ \omega_y \\ \omega_z \end{bmatrix}$$

where:

$\omega_x$=rate about reference $x$ axis
$\omega_y$=rate about reference $y$ axis
$\omega_z$=rate about reference $z$ axis and $\omega_{g_1}$=rate sensed by gyro in first upper octant.
$\omega_{g_2}$=rate sensed by gyro in second upper octant.
$\omega_{g_3}$=rate sensed by gyro in third upper octant.
$\omega_{g_4}$=rate sensed by gyro in fourth upper octant.

Note that the first row of the above matrix equation corresponds to the equation(s) from which the magnitude of the direction cosines was computed.

The angle between gyro input axes is readily determined by examination of the dot product of unit vectors lying along the gyro input axes:

$$\theta_{12}=\theta_{23}=\theta_{34}=\theta_{41}=\text{arc cos }(\bar{e}_1 \cdot \bar{e}_2)$$
$$=\text{arc cos }\tfrac{1}{3} \approx 70.6°$$

where:

$\theta_{12}$=angle between first and second octant gyro input axes
$\theta_{23}$=angle between second and third octant gyro input axes
$\theta_{34}$=angle between third and fourth octant gyro input axes
$\theta_{41}$=angle between fourth and first octant gyro input axes $e_1$=unit vector along second octant gyro input axes=

$$\frac{\sqrt{3}}{3}i+\frac{\sqrt{3}}{3}j+\frac{\sqrt{3}}{3}k$$

$e_2$=unit vector along second octant gyro input axes=

$$-\frac{\sqrt{3}}{3}i+\frac{\sqrt{3}}{3}j+\frac{\sqrt{3}}{3}k$$

$$\theta_{13}=\theta_{24}=\text{arc cos }(e_1 \cdot e_3)$$
$$=\text{arc cos }-\tfrac{1}{3} \approx 109.4°$$

where:

$\theta_{13}$=angle between first and third octant input axes
$\theta_{24}$=angle between second and fourth octant gyro input axes $e_1$=unit vector along first octant gyro input axes=

$$\frac{\sqrt{3}}{3}i+\frac{\sqrt{3}}{3}j+\frac{\sqrt{3}}{3}k$$

$e_3$=unit vector along third octant gyro input axes=

$$-\frac{\sqrt{3}}{3}i-\frac{\sqrt{3}}{3}j+\frac{\sqrt{3}}{3}k$$

Development of the equations which must be mechanized to determine vehicle attitude from the gyro outputs is presented below.

Consider the equations which relate vehicle rates to the rates sensed by the gyros (these equations which were established in a preceding paragraph are repeated here):

$$\begin{bmatrix}\omega_{g_1}\\ \omega_{g_2}\\ \omega_{g_3}\\ \omega_{g_4}\end{bmatrix}=\frac{\sqrt{3}}{3}\begin{bmatrix}1 & 1 & 1\\ -1 & 1 & 1\\ -1 & -1 & 1\\ 1 & -1 & 1\end{bmatrix}\begin{bmatrix}\omega_x\\ \omega_y\\ \omega_z\end{bmatrix}$$

where:

$\omega_x$=vehicle $x$ axis rate
$\omega_y$=vehicle $y$ axis rate
$\omega_z$=vehicle $z$ axis rate
$\omega_{g_1}$=rate sensed by first octant gyro
$\omega_{g_2}$=rate sensed by second octant gyro
$\omega_{g_3}$=rate sensed by third octant gyro
$\omega_{g_4}$=rate sensed by fourth octant gyro To determine vehicle axis angular rates from the rates sensed by the gyros, only three gyro outputs are required. This situation results in four different sets of equations (four things taken three at a time). These sets, together with their respective inverses, are given below:

Set 1.—Fourth octant gyro excluded:

$$\begin{bmatrix}\omega_{g_1}\\ \omega_{g_2}\\ \omega_{g_3}\end{bmatrix}=\frac{\sqrt{3}}{3}\begin{bmatrix}1 & 1 & 1\\ -1 & 1 & 1\\ -1 & -1 & 1\end{bmatrix}\begin{bmatrix}\omega_x\\ \omega_y\\ \omega_z\end{bmatrix}$$

The inverse relation is:

$$\begin{bmatrix}\omega_x\\ \omega_y\\ \omega_z\end{bmatrix}=\frac{\sqrt{3}}{2}\begin{bmatrix}1 & -1 & 0\\ 0 & 1 & -1\\ 1 & 0 & 1\end{bmatrix}\begin{bmatrix}\omega_{g_1}\\ \omega_{g_2}\\ \omega_{g_3}\end{bmatrix}$$

Set 2.—Third octant gyro excluded:

$$\begin{bmatrix}\omega_{g_1}\\ \omega_{g_2}\\ \omega_{g_4}\end{bmatrix}=\frac{\sqrt{3}}{3}\begin{bmatrix}1 & 1 & 1\\ -1 & 1 & 1\\ 1 & -1 & 1\end{bmatrix}\begin{bmatrix}\omega_x\\ \omega_y\\ \omega_z\end{bmatrix}$$

The inverse relation is:

$$\begin{bmatrix}\omega_x\\ \omega_y\\ \omega_z\end{bmatrix}=\frac{\sqrt{3}}{2}\begin{bmatrix}1 & -1 & 0\\ 1 & 0 & -1\\ 0 & 1 & 1\end{bmatrix}\begin{bmatrix}\omega_{g_1}\\ \omega_{g_2}\\ \omega_{g_4}\end{bmatrix}$$

Set 3.—Second octant gyro excluded:

$$\begin{bmatrix}\omega_{g_1}\\ \omega_{g_3}\\ \omega_{g_4}\end{bmatrix}=\frac{\sqrt{3}}{3}\begin{bmatrix}1 & 1 & 1\\ -1 & -1 & 1\\ 1 & -1 & 1\end{bmatrix}\begin{bmatrix}\omega_x\\ \omega_y\\ \omega_z\end{bmatrix}$$

The inverse relation is:

$$\begin{bmatrix}\omega_x\\ \omega_y\\ \omega_z\end{bmatrix}=\frac{\sqrt{3}}{2}\begin{bmatrix}0 & -1 & 1\\ 1 & 0 & -1\\ 1 & 1 & 0\end{bmatrix}\begin{bmatrix}\omega_{g_1}\\ \omega_{g_3}\\ \omega_{g_4}\end{bmatrix}$$

Set 4.—First octant gyro excluded:

$$\begin{bmatrix}\omega_{g_2}\\ \omega_{g_3}\\ \omega_{g_4}\end{bmatrix}=\frac{\sqrt{3}}{3}\begin{bmatrix}-1 & 1 & 1\\ -1 & -1 & 1\\ 1 & -1 & 1\end{bmatrix}\begin{bmatrix}\omega_x\\ \omega_y\\ \omega_z\end{bmatrix}$$

The inverse relation is:

$$\begin{bmatrix}\omega_x\\ \omega_y\\ \omega_z\end{bmatrix}=\frac{\sqrt{3}}{2}\begin{bmatrix}0 & -1 & 1\\ 1 & -1 & 0\\ 1 & 0 & 1\end{bmatrix}\begin{bmatrix}\omega_{g_2}\\ \omega_{g_3}\\ \omega_{g_4}\end{bmatrix}$$

It should be noted that an inverse relation exists in each of the four sets of equations. The existence of an inverse is a direct consequence of the emplacement orientation. If any two gyros are collinear and/or any three coplanar, all of the inverses would not exist.

A key feature to be noted in the above result is that data pertaining to a reference axis is obtained by a summation of only two gyro outputs—with no scaling differences. The general case of indiscriminate orientation of gyroscope input axes requires a summation of three gyro outputs with distinct scale factors, which is a disadvantage for either analog or digital mechanization.

The orientation of the output axes of the gyros can be established by consideration of acceleration drift sensitivity and/or packaging/fabrication factors. To evaluate these criteria, consider the matrix equation relating the gyro input, rotor spin and gyro output coordinate axes of gyro No. 1 to the reference axes (because of the symmetry of the emplacement, the situation for the other three gyros is similar):

$$\begin{bmatrix}x\\ y\\ z\end{bmatrix}=\begin{bmatrix}\sqrt{\frac{3}{3}} & a_{12}a_{13}\\ \sqrt{\frac{3}{3}} & a_{22}a_{23}\\ \sqrt{\frac{3}{3}} & a_{32}a_{33}\end{bmatrix}\begin{bmatrix}I\\ O\\ H\end{bmatrix}$$

where $x$, $y$, $z$ are the reference axes projections of the gyro coordinates

I=gyro input axes
O=gyro output axes
H=gyro spin axes
$a_{ij}$=direction cosines The first column of the matrix consists of the input axis direction cosines resulting from the symmetric emplacement. Selection of the $a_{ij}$'s will establish output axes orientation. The matrix is orthogonal so that the $a_{ij}$'s are constrained by: (1) the sum of the squares of column (row) elements must be unity and (2) the dot product of columns (rows) must be zero. Therefore, if it is assumed as previously, that the principal acceleration will occur along the vehicle roll ($x$) axis, element $a_{12}$ should be maximized. This maximization will ensure minimum acceleration drift sensitivity. The maximum value of $a_{12}$ can be realized by setting $a_{13}=0$.

$a_{12}$ is then:

$$a_{12}=\sqrt{1-a_{11}^2}=\sqrt{1-\frac{1}{3}}=\sqrt{\frac{2}{3}}=\pm\frac{\sqrt{6}}{3}$$

$$\approx \text{arc cos } 35$$

The remaining terms $a_{22}$ and $a_{23}$ are then established as (assuming $a_{12}=+\sqrt{6}/3$):

$$a_{22}=-\sqrt{6}/6\approx \cos 114°$$

$$a_{23}=-\sqrt{6}/6\approx \cos 114°$$

In a similar fashion, the orientation of the other three gyros can be determined. FIGURE 2 depicts a typical packaging result employing the minimum acceleration drift sensitivity constraint. This "butterfly" package is not particularly desirable from either a fabrication or density standpoint. An alternate approach is to place all gyro output axes in the same plane. Referring again to the matrix equation we see that this can be accomplished by setting $a_{32}=0$. If this procedure is followed for all four gyros, all output axes will be in the same plane (the $x$-$y$ plane). Elements $a_{12}$ and $a_{22}$ thereby must be such that:

$$a_{12}=-a_{22}$$

and $$|a_{12}|=\sqrt{2/2}=\cos 45°$$

FIGURE 1.—MINIMUM ACCELERATION DRIFT SENSITIVITY ORIENTATION

Figure 3:
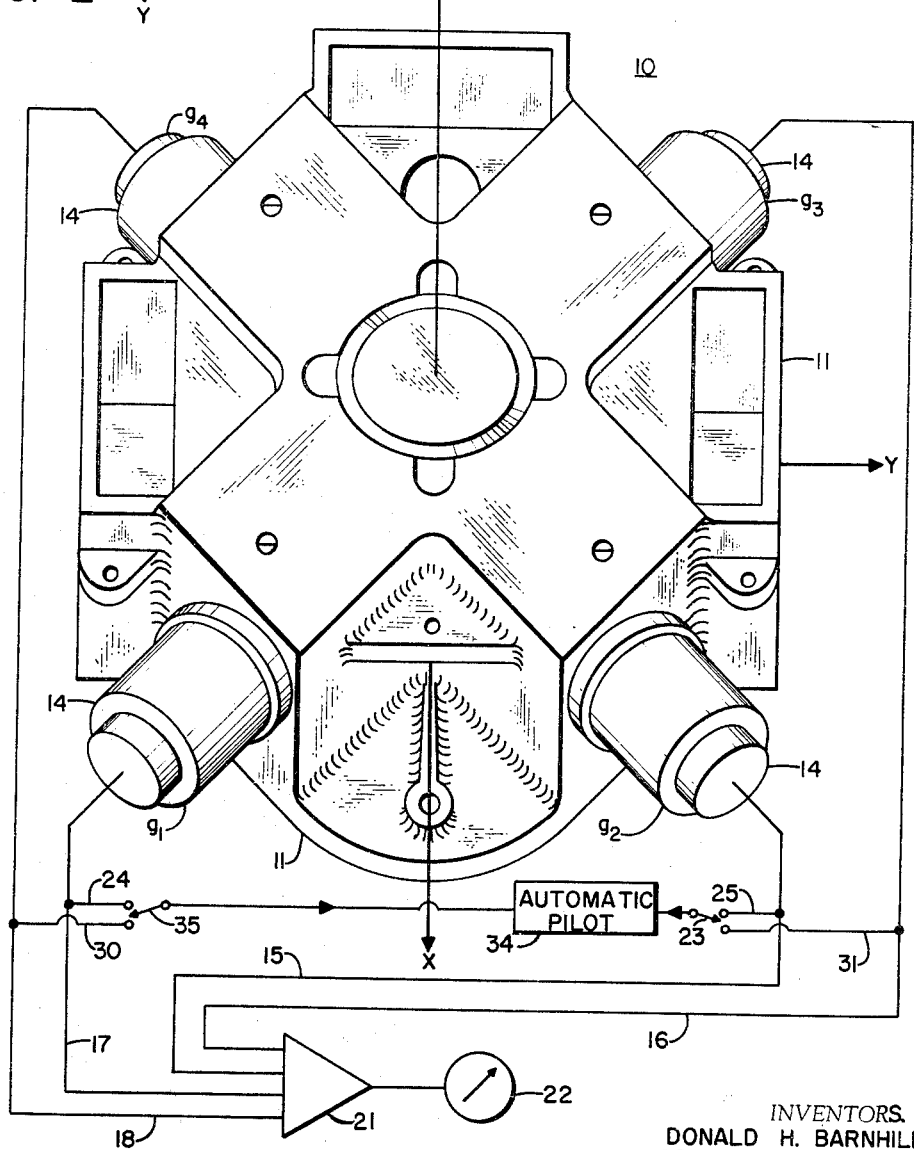
FIGURE 3 is an uptilted view of a preferred embodiment of the attitude reference system where the output axes of the plurality of gyros are coplanar.

A typical preferred packaging result of employing this approach is shown in FIGURE 3. This package features coplanar gyro output axes orientation in the x, y plane and skewed input axes of the gyros with relatively simple fabrication and testing procedures because of the "symmetry" that prevails. These advantages are slightly offset by the increase in acceleration drift sensitivity that results. The minimum case has a coefficient equal to the sine $35° \approx 0.57$. The case involving the advantageous packaging has a coefficient equal to sine $45° = 0.707$—a 23 percent increase. However, this increase is, in most applications, not a significant consideration.

For the particular emplacement orientation selected, a relatively simple form of failure detection equation can be implemented:

$$\omega_1 - \omega_2 + \omega_3 - \omega_4 = 0$$

since from Set 1, $$\omega_x = \sqrt{3/2} \ (\omega_{g_1} - \omega_{g_2})$$

and from Set 3, $$\omega_x = \sqrt{3/2} \ (-\omega_{g_3} + \omega_{g_4})$$

∴ by substitution and dividing out $$\sqrt{3/2}(\omega_{g_1} - \omega_{g_2} + \omega_{g_3} - \omega_{g_4}) = 0$$

Consequently unless the signals from the four gyros equals zero as summed above, a failure in one of the gyros has occurred. Such summing of signals may be accomplished by conventional methods, as by differential amplifier where:

$$\omega_i = \text{output of } i^{\text{th}} \text{ gyro}$$

The above equation results from equating the redundant expressions (i.e., the different equation sets) for the reference axis data.

In general, the failure of one gyro will prevent the equations from being satisfied. The four-gyro approach does not provide for fault isolation. However, in many spacecraft applications, failure diagnostics are easily implemented with on-board celestial sensors (e.g., star trackers and sun sensors). This diagnostics procedure involves monitoring gyro output while the spacecraft utilizes the celestial sensors as an attitude reference. The failure-detecting feature provides performance assurance during spacecraft attitude maneuvers (for midcourse corrections, etc.)

Figure 1:
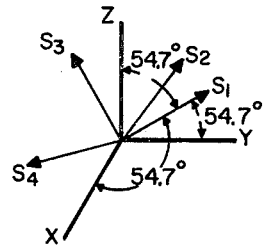
FIGURE 1 is a vector diagram of the relationship between the orthogonal axes of a craft and the input axes of each of a plurality of gyroscopes of the attitude reference system.

Referring to FIGURE 1, the orthogonal or reference axes, X, Y, Z are conventionally shown with the Y axis conforming with the lateral axis of the craft. The vectors $S_1$, $S_2$, $S_3$, $S_4$ represent the direction of the input axes of the four sensors which are thus arranged in a skewed manner. In the present embodiment, the sensors, which are four in number, may be floated gyroscopes such as that disclosed in United States Patent to Morgan et al. 2,856,776. When such floated gyroscopes are used as integrating gyroscopes, the attitude reference system will provide attitude about the craft reference axes. However, if the floated gyroscopes are used as rate gyroscopes, the attitude reference system will provide signals in accordance with the rate of rotation of the craft about its reference axes. It will be appreciated that the input axis of a floated gyroscope is perpendicular to the plane formed by the spin axis and the output axis of such gyroscope.

In FIGURE 2, an attitude reference device 10 comprises a base member 11 mounted on the craft with the axes thereof conforming to the principal orthogonal reference axes x, y, z of the aircraft. The base member 11 supports a plurality of gyroscopes $g_1$, $g_2$, $g_3$ and $g_4$; one of such gyroscopes 14 is shown in position on the base 11. Each sensor 14 has its sensitive axis (input axis) tilted upwardly or oriented so that the magnitudes of the direction cosines relating the sensor sensitive axis to the x, y, z reference axes of the craft are equal. The value of the angle associated with these cosines is arc cos $\sqrt{3/3}$ of approximately 55 degrees. The position of the output axis may be selected as desired by rotating the gyro about this axis.

The advantage of this arrangement relative to conventional three sensor orthogonal system is that greater system reliability is obtainable. Only three of the four sensors need function to provide complete three axis reference data.

The advantage of the selected emplacement orientation relative to a general four sensor emplacement wherein the input axes of the sensors are indiscriminately positioned in the inherent simplicity is the equations that must be mechanized to obtain the desired reference axis data for control purposes. In the general arrangement mentioned, the data for each reference axis must be obtained from a summation of three sensor outputs, each output requiring distinct scaling factors. The selected symmetric emplacement of the gyros in FIGURE 2 however affords the simple expedient of summing only two sensor outputs for data about each reference without scaling differences. Thus this feature significantly reduces the number of components required for mechanization of the pertinent equations by either analog or digital methods.

While the arrangement in FIGURE 2 has been illustrated as including the rate sensors, it is applicable also to the measurement of acceleration, that is, the use of accelerometers instead of rate sensors.

FIGURE 3 shows a preferred embodiment of the four gyro attitude rate reference system based primarily on more ease of manufacture than FIGURE 2. In FIGURE 3 the base member 11 has mounted therein four gyros 14 indicated as $g_1$, $g_2$, $g_3$ and $g_4$ in FIGURE 3; the output axes of the four gyroscopes are in the plane formed by the X-Y axes of the craft or parallel thereto, the input axes have the same orientation as in FIGURE 2. Each input axis responds to rotation about each principal orthogonal axis. The electrical signals provided by precession of the gyroscopes about their output axes are supplied by their respective conductors 15, 16, 17 and 18 to an amplifier 21 which operates an indicator 22. The amplifier may be of the differential summing type and the indicator 22 is used for monitoring purposes in that under normal operation, the summation of the signals from the four gyroscopes should within limits equal zero. However, if the amplifier 21 has a significant output to alter the pointer of indicator 22 a malfunction has occurred in the gyros. In such case, the faulty gyroscope may be eliminated from control and the three gyroscopes remaining will provide signals in accordance with movements of the aircraft about its three reference axes.

The four sets of matrices set out above show that the attitude about the reference axes or for example the rates about the reference axis require only three gyro outputs. Similarly, to determine the rates sensed by the gyros about one reference axis requires merely two gyros. For example, from set one above, for the inverse relation, $\omega_x$ is obtained from gyros $g_1$, $g_2$. In the case of malfunction of gyro $g_1$, set three for the inverse relation shows that $\omega_x$ of the craft may be obtained from gyros $g_3$ and $g_4$.

Suitable switching may be provided upon indication of a malfunction in FIGURE 3 to delete signals from the malfunctioning gyroscope. For example, on malfunction of gyro $g_1$, its output conductor may be disconnected from the automatic pilot 34 for X axis control by switch 35 and output conductor 30 from gyro $g_4$ may be connected to automatic pilot 34. A similar switching arrangement is provided for gyros $g_2$ and $g_3$. Such switching arrangement and indicator may be also applied to the embodiment of FIGURE 2. Similar arrangements as in FIGURE 3 may be provided for Y and Z axis control by the automatic pilot since $$\omega_y = \frac{\sqrt{3}}{2} (\omega_{g_2} - \omega_{g_3}) = \frac{\sqrt{3}}{2} (\omega_{g_1} - \omega_{g_4})$$

and $$\omega_z = \frac{\sqrt{3}}{2} (\omega_{g_2} + \omega_{g_4}) = \frac{\sqrt{3}}{2} (\omega_{g_1} + \omega_{g_3})$$

While there has been shown and described specific embodiments of this invention, further modifications and improvements will appear to those skilled in the art.

What is claimed is:

1. An attitude reference device for a craft comprising: four sensors having input and output axes; a base member fixed to the craft; means mounting the sensors in said base member so that the input axes of the sensor are in a skewed or nonorthogonal relation relative to the x, y, z reference axes of the craft and the output axes are in a common plane; and means summing the signals from the output axes of said four sensors due to craft movement about the input axes to provide signals in accordance with the movements of the craft about its reference axes.

2. The apparatus of claim 1 wherein the input axis of each sensor forms equal angles with each of the three reference axes x, y and z of the craft.

3. The apparatus of claim 1, wherein the sensors are gyroscopes each having an output axis or one axis of angular freedom in addition to its spin axis about which its rotor continuously rotates and an input axis which is perpendicular to the plane formed by the spin axis and output axis.

4. The apparatus of claim 3, wherein the output axes of the sensors are arranged in or parallel to the plane of the X, Y axes of the craft.

5. The apparatus of claim 1, wherein the sensors are gyroscopes and the signals from the gyroscopes are combined so that the movement of the craft about any of its reference axes is in accordance with the signal from two of said skewed sensors.

6. The apparatus of claim 1 and fault indication means responsive jointly to the algebraic sum of the signals from said four sensors.

7. The apparatus of claim 1, said sensors being gyroscopes, and signal combining or algebraic summing means wherein the signals from the gyroscopes are so combined that signals in accordance with movements of the craft about its three axes are obtained from three of the four sensors.

8. The apparatus of claim 7, and switching means for isolating a malfunctioning sensor from the signal combining means and substituting therefor the signal from another of said sensors.

9. The apparatus of claim 1 wherein the four sensors are gyroscopes each having a rotor with two axes of rotational freedom about its base and the input axis of each gyroscope about which the base may be rotated makes equal angles with each of the three principal orthogonal axes of the craft.

10. The apparatus of claim 9, said summing means combining signals from said gyros so that a signal in accordance with the movement of the craft about an axis is obtained from the signals from two gyroscopes.

References Cited

UNITED STATES PATENTS

| | | |
|---|---|---|
| 2,762,123 | 9/1956 | Schultz et al. _____ 74—5.34 X |
| 2,835,131 | 5/1958 | Vacquier et al. |
| 3,231,726 | 1/1966 | Williamson _____ 235—150.25 X |
| 3,258,977 | 7/1966 | Hoffman. |
| 3,269,179 | 8/1966 | Anderson. |

ROBERT B. HULL, Primary Examiner

U.S. Cl. X.R.

33—226; 74—5.34; 235—150.25